United States Patent [19]

Coburn, Jr.

[11] Patent Number: 4,999,075
[45] Date of Patent: Mar. 12, 1991

[54] PROCESSES OF MASS MANUFACTURING A PLURALITY OF SECURITY CARDS AND PROCESSES OF MANUFACTURING SECURITY CARD SUBSTRATES FROM WHICH A PLURALITY OF SECURITY CARDS MAY BE FURTHER MANUFACTURED

[76] Inventor: Joseph W. Coburn, Jr., 953 Princewood Ave., Lakewood, N.J. 08701

[21] Appl. No.: 362,841
[22] Filed: Jun. 7, 1989
[51] Int. Cl.$^5$ .............................................. B29D 9/00
[52] U.S. Cl. .................................. 156/209; 156/270; 156/277; 427/7
[58] Field of Search ............... 156/277, 209, 319, 269, 156/270, 151, 324; 40/625, 626, 630, 1.5; 283/904, 86, 91, 109, 110, 111; 427/7, 424

[56] References Cited

U.S. PATENT DOCUMENTS

| | | | |
|---|---|---|---|
| 3,152,901 | 10/1964 | Johnson | 156/277 |
| 4,894,110 | 1/1990 | Lass | 156/277 |
| 4,938,830 | 7/1990 | Cannistra | 156/277 |

Primary Examiner—Ivars Cintins
Attorney, Agent, or Firm—R. Gale Rhodes, Jr.

[57] ABSTRACT

Process of mass manufacturing a plurality of security cards including the steps of embossing a surface of a layer of plastic film at first locations with visual image producing devices such as holograms or diffraction gratings, metalizing the surface including the visual image producing devices, applying a layer of background ink over the surface except for where the visual image producing devices are located, printing indicia on the background ink at second locations, laminating a layer of clear plastic film over the surface to form a laminate, cutting individual security cards out of the laminate and embossing indicia into third locations. An alternate process of mass manufacturing a plurality of security cards includes the step of embossing a surface of a layer of plastic film at first locations with visual image producing devices such as holograms and diffraction gratings, metalizing the surface including the devices, applying a clear protective coating only over the metalized visual image producing devices to prevent the removal of the metalization thereover, removing the metalization except for the metalization over the visual image producing devices, printing indicia of the type noted above on the surface at second locations but not on the devices, laminating a layer of plastic film over the surface to form a laminate, cutting the laminate into a plurality of individual security cards, and embossing indicia into the individual security cards at third locations. Security cards manufactured by the foregoing processes of manufacture are also part of the present invention.

Also processes of manufacturing a security card substrate from which a plurality of security cards may be further manufactured in accordance with the present processes.

7 Claims, 5 Drawing Sheets

FIG. A

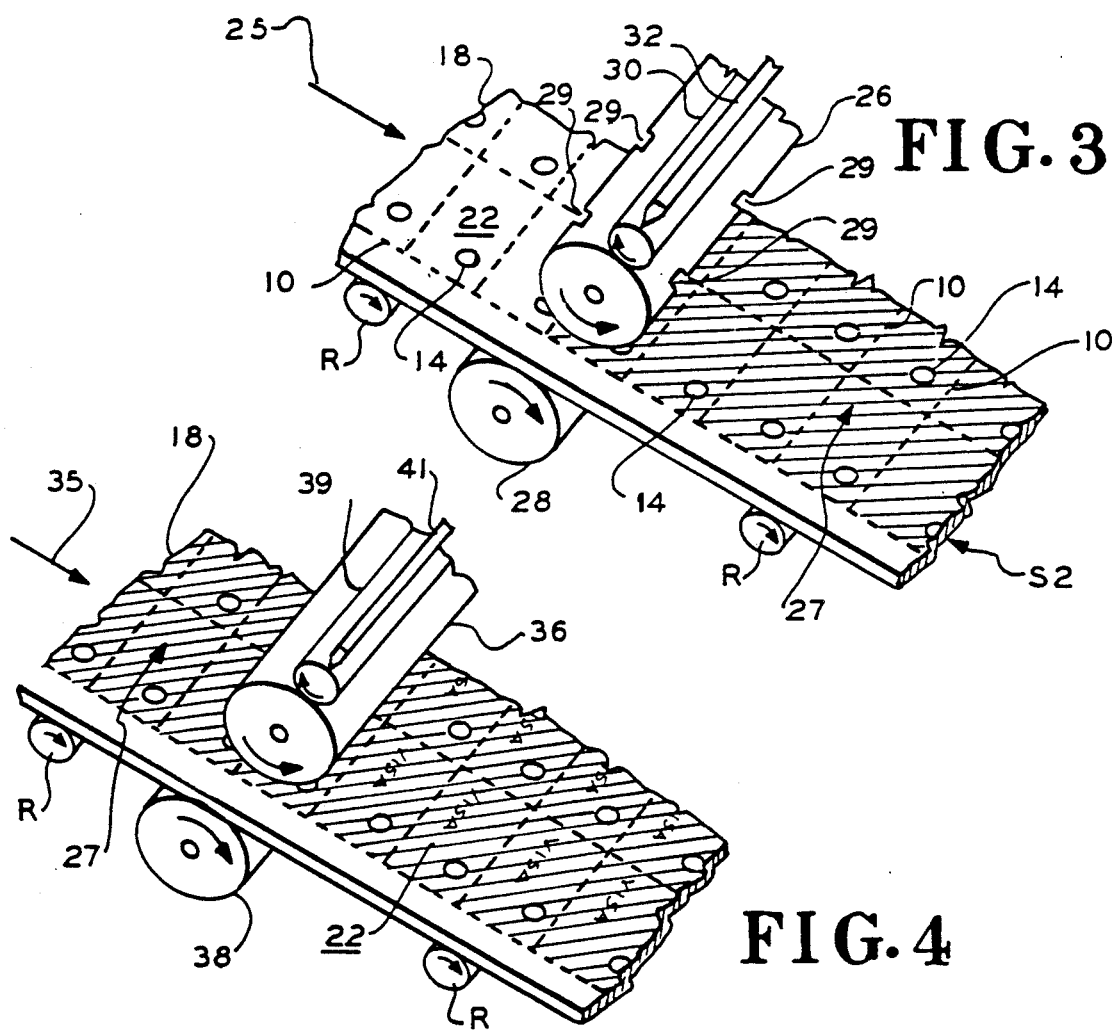
FIG. 3
FIG. 4
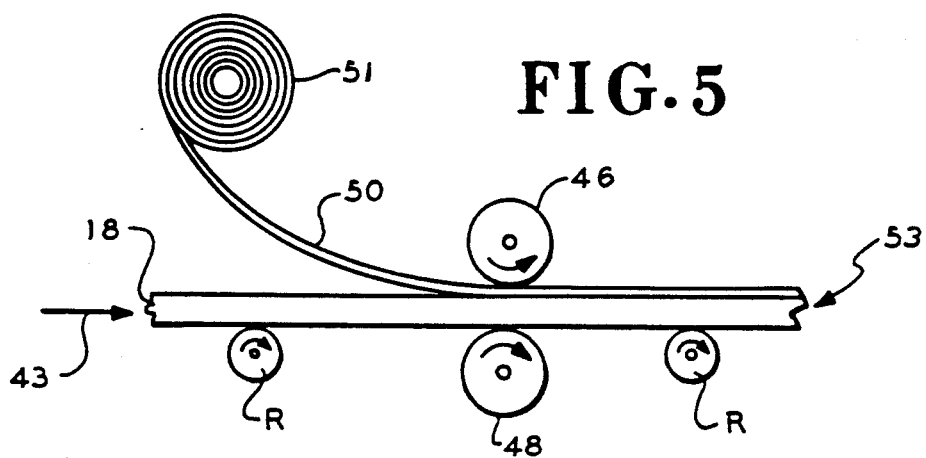
FIG. 5

PROCESSES OF MASS MANUFACTURING A PLURALITY OF SECURITY CARDS AND PROCESSES OF MANUFACTURING SECURITY CARD SUBSTRATES FROM WHICH A PLURALITY OF SECURITY CARDS MAY BE FURTHER MANUFACTURED

BACKGROUND OF THE INVENTION

This invention relates to new and useful processes of mass manufacturing a plurality of security cards, to new and useful processes for manufacturing security card substrates from which a plurality of security cards may be further manufactured, and to security cards and security card substrates from which a plurality of security cards may be further manufactured.

As used herein and in the appended claims, the term "security card" is used to mean credit cards and debit cards. Credit cards being those cards typically issued to a cardholder and used by the cardholder to purchase goods the cost of which is credited against the cardholder's account. Debit cards being those cards typically purchased by a cardholder and used by the cardholder to pay for goods the cost of which is debited against the cardholder's account or used by the cardholder to pay taxes, such as a sales tax, with the amount of the tax paid being debited against the cardholder's account.

The term "security card substrate from which a plurality of security cards may be further manufactured" as used herein and in the appended claims is used to mean a new and useful manufacture or article of manufacture as provided for in 35 U.S.C. 101 and is used to mean a substrate including a plurality of partially manufactured security cards which substrate may be sold to a plurality of third parties for further manufacture into a completed security cards. Different third parties may take the same substrate and further manufacture it into a completed security card bearing indicia peculiar to each third party, for example, third parties desiring to complete manufacture into VISA ® cards or MASTER-CARDS ® may take the same security card substrate and imprint thereon information particular to the VISA ®card or particular to the MASTERCARD ® and may further provide thereon indicia such as logos and the like particular to each different individual credit card company.

As is known to those skilled in the security card art, particularly the credit card art, credit cards are provided with visual image producing devices which receive and reflect light to produce a visual image perceptible to the human eye in ordinary light such as sunlight, incandescent light and fluorescent light. Such visual image producing devices may be a hologram, two or three dimensional, or a diffraction grating such as a spiral diffraction grating or a composite diffraction grating made of a plurality of diffraction gratings of different designs or portions of diffraction gratings arranged in predetermined patterns. Such visual image devices, particularly holograms, are made of extremely thin material whereby the removal of the visual image device from the security card virtually assures destruction of the visual image device thereby substantially eliminating the unauthorized copying or counterfeiting of the visual image device; similarly for diffraction gratings. As is further known, the thin material visual image producing devices are adhered to the card with an adhesive producing a strong bond whereby breaking of the bond to remove the visual image producing device further assures its destruction.

It will be further understood that the security card substrates of the present invention, from which a plurality of security cards may be further manufactured, enhance the efficiency of manufacturing security cards, provide the flexibility of permitting different card companies to use the same security card substrate to complete the manufacture of cards specific or particular to each different card company, and reduce the manufacturing costs of security cards.

SUMMARY OF THE INVENTION

Process of mass manufacturing a plurality of security cards including the steps of embossing a surface of a layer of plastic film at first locations with visual image producing devices such as holograms or diffraction gratings, metalizing the surface including the visual image producing devices, applying a layer of background ink over the surface except for where the visual image producing devices are located, printing indicia, such as information concerning the card company, its logo, etc., on the background ink at second locations, laminating a layer of clear plastic film over the surface to form a laminate, cutting individual security cards out of the laminate and embossing indicia, such as the name and number of an individual card holder, into third locations. An alternate process of mass manufacturing a plurality of security cards includes the steps of embossing a surface of a layer of plastic film at first locations with visual image producing devices such as holograms and diffraction gratings, metalizing the surface including the devices, applying a clear protective coating only over the metalized visual image producing devices to prevent the removal of the metalization thereover, removing the metalization except for the metalization over the visual image producing devices, printing indicia of the type noted above on the surface at second locations but not on the devices, laminating a layer of plastic film over the surface to form a laminate, cutting the laminate into a plurality of individual security cards, and embossing indicia of the type noted above into the individual security cards at third locations. Security cards manufactured by the foregoing processes of manufacture are also part of the present invention.

Also process of manufacturing a security card substrate from which a plurality of security cards may be further manufactured including the steps of embossing a surface of the layer of plastic film at first locations with visual image producing devices such as holograms or diffraction gratings and metalizing the surface including such devices; alternatively, the process may include the further step of applying a layer of background ink over the surface except where the visual image producing devices are located. An alternative process of manufacturing a security card substrate from which a plurality of security cards may be further manufactured includes the steps of embossing a surface of a layer of plastic film at first locations with visual image producing devices of the type noted above, metalizing the surface including the devices, applying a clear protective coating over only the metalized visual image producing devices to prevent removal of the metalization thereover, and removing the metalization except for the metalization over the coated visual image producing devices. Substrates, from which a plurality of security cards may be further manufactured, manufactured by the foregoing processes are also part of the present invention.

DESCRIPTION OF THE DRAWINGS

FIG. A is a top view of a security card embodying the present invention;

FIGS. 1-7 are, respectively, diagrammatical illustrations of manufacturing process steps for manufacturing a plurality of security cards in accordance with a first embodiment of the present invention; FIGS. 1 and 2, and 1, 2 and 3, are, respectively, diagrammatical illustrations of alternate embodiment manufacturing process steps for manufacturing security card substrates from which a plurality of security cards may be further manufactured, more particularly:

FIG. 1 is a diagrammatical illustration of embossing the top surface of a layer of plastic film at predetermined locations with visual image producing devices;

FIG. 2 is a diagrammatical illustration of metalizing the top surface of the plastic film including the visual image producing devices;

FIG. 3 is a diagrammatical illustration of applying background ink over the top surface except where the visual image producing devices are located;

FIG. 4 is a diagrammatical illustration of printing indicia on the background ink at a second predetermined location;

FIG. 5 is a diagrammatical illustration of laminating a layer of clear plastic film over the top surface to form a laminate;

FIG. 6 is a diagrammatical illustration of cutting individual security cards out of the laminate;

FIG. 7 is a diagrammatical illustration of embossing indicia into the laminate at third predetermined locations preferably at least partially into the visual image producing device;

FIGS. 8, 9, 10, 10A and 11 are, respectively, diagrammatical illustrations of manufacturing process steps for manufacturing a security card substrate from which a plurality of security cards may be further manufactured, more particularly:

FIG. 8 is a diagrammatical illustration of embossing the top surface of a layer of plastic film at predetermined locations with the visual image producing devices;

FIG. 9 is a diagrammatical illustration of metalizing the top surface including the visual image producing devices;

FIG. 10 is a diagrammatical illustration of applying a clear protective coating only over the metalized visual image producing devices to prevent the removal of the metalization over the visual image devices in accordance with the next following manufacturing step;

FIG. 10A is a partial view of the top roller shown in FIG. 10;

FIG. 11 is a composite diagrammatical illustration of removing the metalization applied to the top surface except for the metalization applied over the protectively coated visual image producing devices;

FIG. 12 is a diagrammatical illustration of printing indicia on the top surface at second predetermined locations but not on the metalized visual image producing devices;

FIG. 13 is a diagrammatical illustration of laminating a layer of clear plastic film over the top surface to form a laminate;

FIG. 14 is a diagrammatical illustration of cutting the laminate into individual security cards; and FIG. 15 is a diagrammatical illustration of embossing indicia into the individual security cards at third predetermined locations.

DETAILED DESCRIPTION

Figure 1:
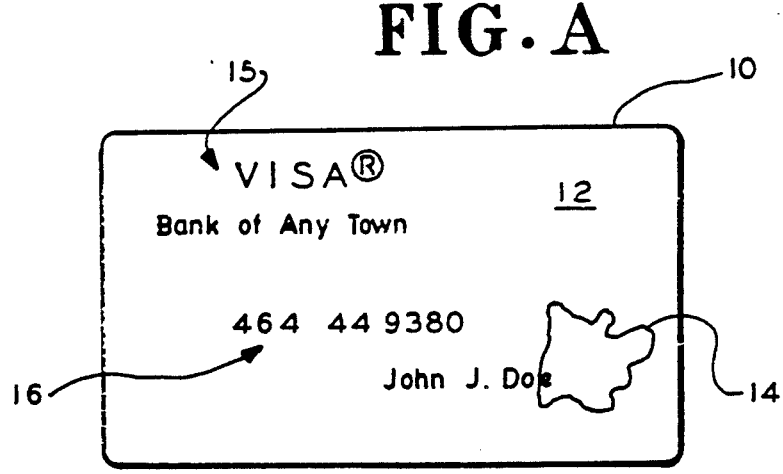
Figure 1:
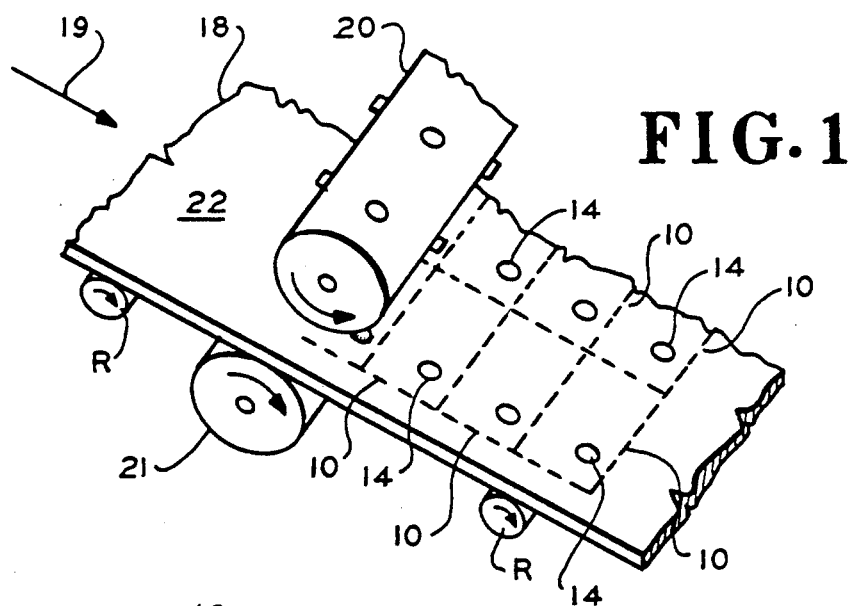

Referring now to FIG. A, there is illustrated a security card 10, for example a credit card, embodying the present invention, i.e. the security card 10 is manufactured in accordance with the manufacturing processes of the present invention and the security card 10 is a manufacture, or article of manufacture, as provided for in 35 U.S.C. 101 and for which patent protection is claimed herein; security card 10 is a product by process invention. The security card 10 includes a top surface 12 into which a visual image producing device 14, such as for example a hologram, has been embossed at a first predetermined location. Indicia indicated by general numerical designation 15, e.g. VISA ® and Bank Of Any Town, are printed on the top surface 12 at a second predetermined location. And indicia indicated by general numerical designation 16, e.g. a typical credit card number such as 464 44 9380 and the name of the cardholder, John J. Doe, are embossed into the security card 10 at a third predetermined location and preferably at least partially into the visual image producing device 14 as shown to enhance the difficulty of unauthorized removal and duplication of the visual image producing device 14 and to enhance the assurance of destruction of the visual image producing device 14 upon attempted removal thereof.

Referring now to the processes of manufacture of the present invention and security cards manufactured thereby, reference first is made generally to FIGS. 1-7 and in particular to FIG. 1. In FIG. 1, a layer of plastic film 18 is advanced in the direction of the arrow 19 by suitable transfer rollers R between a pair of suitable embossing rollers 20 and 21 which emboss a plurality of visual image producing devices 14 (e.g. two or three dimensional holograms or diffraction gratings such as spiral diffraction gratings of the type noted above) into the top surface 22 of the layer of plastic film 18 at first predetermined locations. The layer of plastic film 18 may be, for example, polycarbonate, polyester, PVC or the like. The plurality of security cards 10 to be manufactured are illustrated in dashed outline on the top surface 22 of the layer of plastic film 18 and identified by numerical designations 10. The top embossing roller 20 is provided with a plurality of outwardly extending projections as shown whose outer surfaces are shaped to emboss the desired visual image producing devices 14 into the top surface 22 of the plastic film 18.

Figure 2:
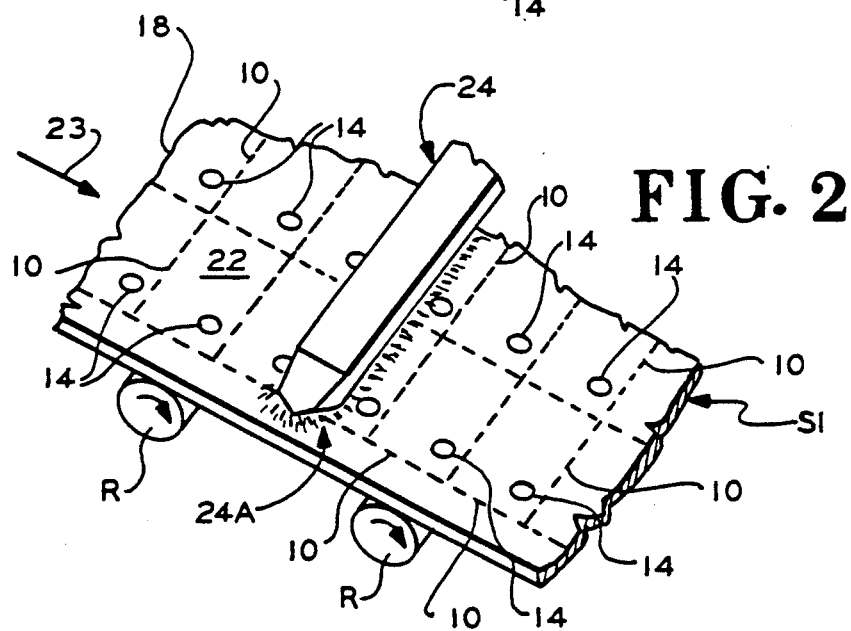

As illustrated diagrammatically in FIG. 2, the layer of plastic film 18 is further advanced in the direction of the arrow 23 by suitable transfer rollers R to advance the layer of plastic film 18 past suitable metalizing apparatus indicated by general numerical designation 24 which metalizes the top surface 22 of the layer of plastic film 18 including the visual image producing devices 14; such metalization being indicated diagrammatically by the spray lines indicated by general numerical designation 24A. The thickness of the layer of metalization may be, for example, approximately 1,000 angstroms.

Thereafter, as illustrated diagrammatically in FIG. 3, the layer of plastic film 18 is advanced by suitable transfer rollers R in the direction of the arrow 25 between suitable print rollers 26 and 28 which print background ink on the top surface 22 of the film 18 except over the visual image producing devices 14; the background ink is illustrated by the shading lines identified by general numerical designation 27 and is for being overprinted with indicia such as indicia 15 of FIG. A. The top or background ink applicator roller 26 is provided with a plurality of inwardly extending holes or openings indicated diagrammatically by numerical references 29 for rolling over and being placed in registration with the visual image producing devices 14 to prevent background ink from being applied to or over the visual image producing devices 14. Background ink is applied to the outer surface of the upper roller 26 by a suitable ink transfer roller 30 to which background ink is applied from a suitable container thereof 32.

Subsequently, as illustrated diagrammatically in FIG. 4, the layer of plastic film 18 is advanced by suitable transfer rollers R in the direction of the arrow 35 between suitable opposed print rollers 36 and 38. The outer surface of the top print roller 36 is provided with outwardly extending bosses (not shown) shaped to print indicia, e.g. indicia 15 of FIG. A, over the background ink 17 at second predetermined locations. Printing ink is applied to the outer surface of the top roller 36 by a suitable ink transfer roller 39 to which suitable print ink is applied from a container thereof 41.

As illustrated diagrammatically in 5, the layer of plastic film 18 is thereafter transferred by suitable transfer rollers R in the direction of the arrow 43 between suitable laminating rollers 46 and 48 which apply suitable heat and pressure to laminate a layer of suitable clear plastic film 50, from a supply thereof 51, to the top surface of a layer of plastic film 18 and over the visual image producing devices 14 and the printed indicia, e.g. indicia 15 of FIG. A, printed over the background ink 27. The heat applied by the laminating rollers will be less than the heat distortion temperature of the layer of plastic film 18 to prevent distortion of the visual image producing devices 14 embossed therein.

It will be understood that the manufacturing process steps illustrated diagrammatically in FIGS. 1-5 produce a laminate indicated by general numerical designation 53 which includes the layer of clear plastic film 50, the metalization including the metalized embossed visual image producing devices 14, the background ink 27, the indicia, e.g. indicia 15 of FIG. A, printed on the background ink, and the layer of plastic film 18.

Figure 6:
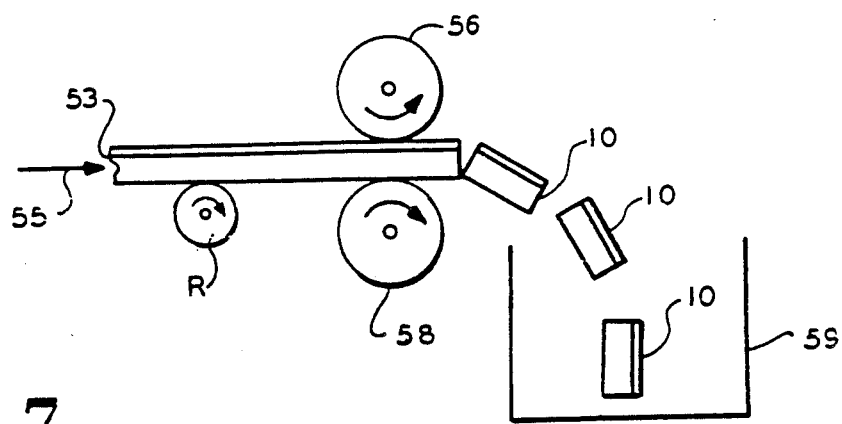

The laminate 52, as illustrated diagrammatically in FIG. 6, is thereafter advanced by suitable transfer roll R in the direction of the arrow 55 between suitable cutting rollers 56 and 58 with the surface of the upper cutting roller 56 being provided with outwardly extending cutting edges (not shown) placed in registration with the dashed lines indicating the plurality of security cards 10 such as shown in FIGS. 1-4 to cut along the dashed outlines and produce a plurality of individual security cards 10 as indicated diagrammatically in FIG. 6 and shown falling into a suitable container or bin 59; alternatively, cutting along the dashed lines may be by suitable steel rule dies.

Subsequently, as illustrated diagrammatically in FIG. 7, each individual security card 10 is suitably advanced in the direction of the arrow 61 between a pair of suitable opposed embossing rollers 64 and 66 for embossing indicia, e.g. indicia indicated by general numerical designation 16 in FIG. A, into the security card 10 at a third predetermined location and preferably at least partially into the visual image producing device 14 as illustrated in FIG. A and for the security purposes described above.

Figure 7:
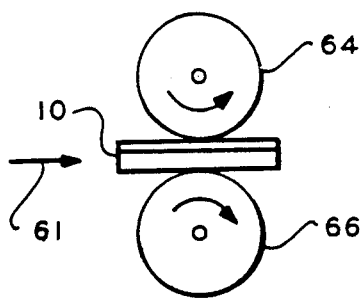
Figure 8:
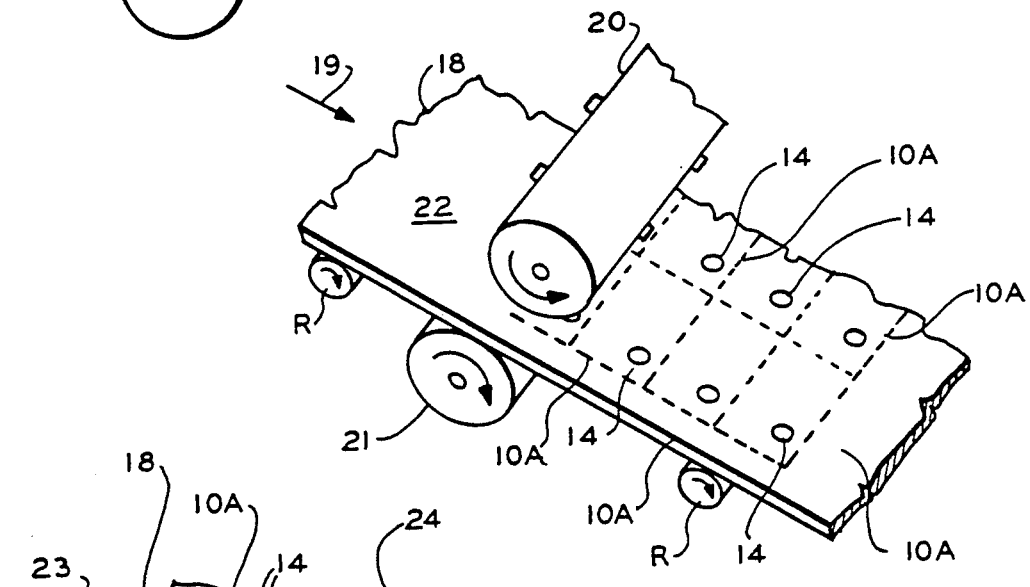
FIGS. 8-15 are, respectively, diagrammatical illustrations of manufacturing process steps for manufacturing a plurality of security cards in accordance with the second embodiment of the present invention.

Thus, it will be understood that the security card 10 upon exiting between the embossing rollers 64 and 66 shown in FIG. 7 is a security card embodying the present invention and being a manufacture or article of manufacture produced by the above-described process of the present invention for mass producing a plurality of such security cards and as illustrated diagrammatically in FIGS. 1-7.

Referring again to FIGS. 1 and 2 and the above description of the manufacturing process steps illustrated diagrammatically therein, it will be understood that in accordance with the further teachings of the present invention upon the manufacturing process steps illustrated diagrammatically in FIGS. 1 and 2 being completed there is produced by the present invention a substrate indicated in FIG. 2 by general numerical designation S1 which is a new and useful manufacture or article of manufacture as provided for by 35 U.S.C. 101. Substrate S1 is a security card substrate from which a plurality of security cards 10 may be further manufactured by different third parties, utilizing the manufacturing process steps illustrated diagrammatically in FIGS. 3-7 and described above, to further or complete the manufacture of the security cards. It will be understood that the security card substrate S1 has the flexibility of being able to be used by different third parties to further manufacture completed security cards as taught herein and wherein each security card will bear the particular logo and other printed information particular to each individual different credit card company. Thus, it will be further understood that the security card substrate S1 is saleable as such, has independent commercial life and is thus both "new" and "useful" as provided for under 35 U.S.C. 101.

Similarly, it will be understood that in accordance with the further teachings of the present invention the manufacturing process steps illustrated diagrammatically in FIGS. 1-3, and described hereinabove produce an alternate embodiment security card substrate indicated by general numerical designation S2 in FIG. 3 from which a plurality of security cards 10 may be further manufactured by different credit card companies in accordance with the further manufacturing steps illustrated diagrammatically in FIGS. 4-7 as described above.

Referring now to the alternate process of manufacture of the present invention and security cards manufactured thereby, reference is now made generally to FIGS. 8-15 with regard to which it will be understood that like items shown in FIGS. 1-7 and described hereinabove are given like numerical references. The security card manufactured by this alternate process has the same top surface disclosed in FIG. A for security card 10, that is visual image producing device 14, indicia 15 and 16, but has different laminated structure as will now be presented and hence the security card produced by this embodiment is given the alternate numerical designation 10A. Accordingly, in FIG. 8 a layer of plastic film 18 is advanced in the direction of the arrow 19 by suitable transfer rollers R between the pair of suitable embossing rollers 20 and 21 which emboss a plurality of visual image producing devices 14 (e.g. two or three dimensional holograms or diffraction gratings such as described above) into the top surface 22 of the layer of plastic film 18 at various predetermined locations. The plurality of security cards 10A to be manufactured are illustrated in dashed line on the top surface 22 of the layer of plastic film 18 and identified by numerical designations 10A. The top embossing roller 20 is provided with a plurality of outwardly extending projections as shown whose outer surfaces are shaped to emboss the desired visual image producing devices 14 into the top surface 22 of the plastic film 18.

Figure 9:
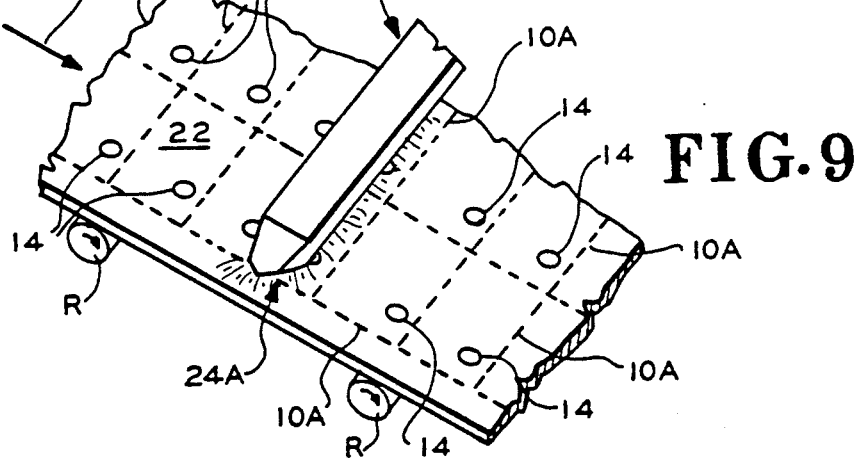

As illustrated diagrammatically in FIG. 9, the layer of plastic film 18 is further advanced in the direction of the arrow 23 by suitable transfer rollers R to advance the roller of plastic film 18 past suitable metalizing apparatus indicated by general numerical designation 24 which metalizes the top surface 22 of the layer of plastic film 18 including the visual image producing devices 14; such metalization being indicated diagrammatically by the spray lines indicated by general numerical designation 24A. As above, the thickness of the layer of metalization may be, for example, approximately 1,000 angstroms.

Figure 10:
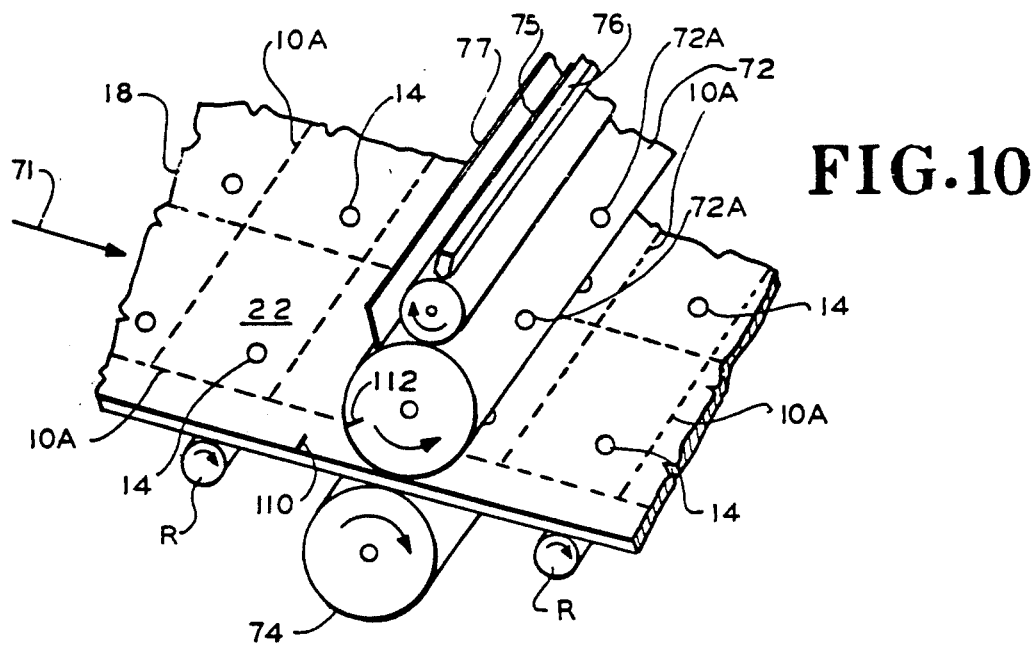
Figure 10A:
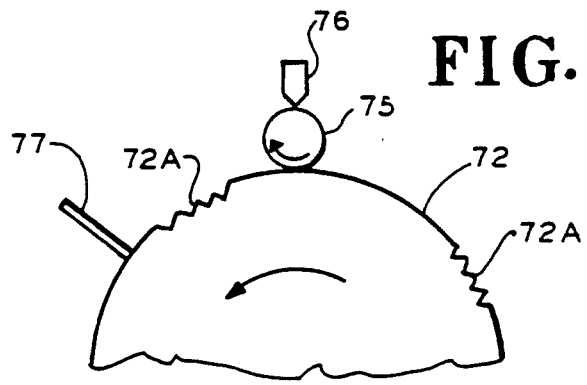
Figure 11:
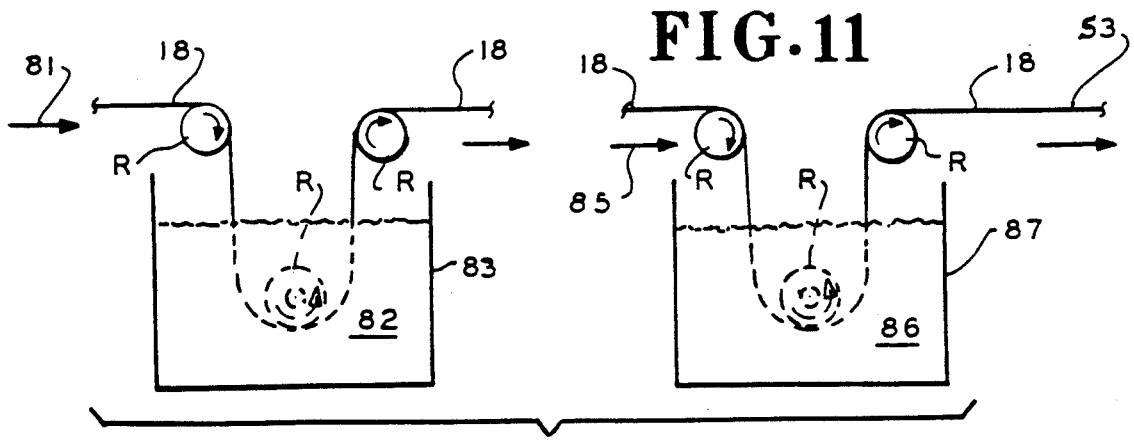
Figure 12:
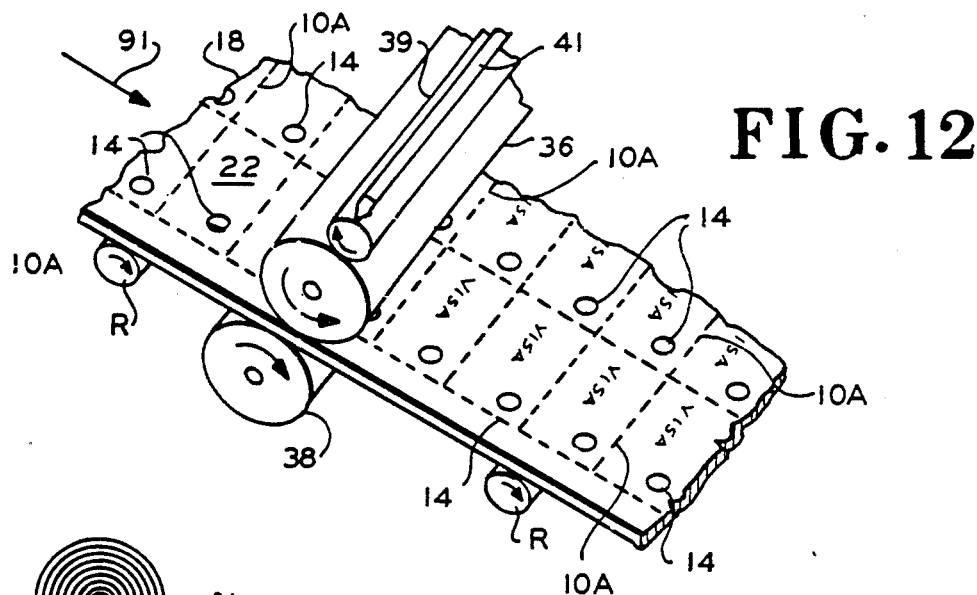

Thereafter, as illustrated diagrammatically in FIG. 10, the layer of plastic film 18 is advanced by suitable transfer rollers in the direction of the arrow 71 between suitable print rollers 72 and 74 whereupon the top roller 72 prints a suitable clear protective ink or coating only over the metalized visual image producing devices 14 to prevent the removal of the metalized film over the visual image producing devices in accordance with the metalization removal step illustrated in FIG. 11 and described below. It will be understood that the top print roller 72, or at least its outer peripheral portion, is made of a suitable relatively soft or elastic material the outer surface of which is provided with a plurality of generally inwardly extending wells or cells, better understood by reference to FIG. 10A, for receiving and containing suitable clear protective ink or coating transferred therein by a suitable transfer roller 75 which has the clear protective ink or coating applied thereto from a suitable container thereof 76. The clear protective coating or ink is applied to the entire outer surface of the top print roller 72 including into the wells or cells 72A but the outer surface of the roller 72 not provided with the wells or cells 72A is wiped clean of the clear protective ink or coating by the wiper 77 as illustrated diagrammatically in both FIGS. 10 and 10A. The print rollers 72 and 74, particularly upper print roller 72, is rotated in registration with the advancing plastic film 18 such that the wells or cells 72A filled with the clear protective ink or coating rotate over and cover the plurality of visual image producing devices 14 and transfer thereto the clear protective ink or coating which covers the top surface of such visual image producing devices.

Subsequently, as illustrated diagrammatically in FIG. 11, the layer of plastic film 18 is thereafter transferred by suitable transfer rollers R in the direction of the arrow 43 into a suitable metalization removal solution or liquid indicated by general numerical designation 82 contained in a suitable container 83; the metalization removal solution or liquid 2 may be, for example, a 5% solution of sodium hydroxide. The metalization removal solution or liquid 82 will remove the metalization from the surface 22 of the layer of plastic film 18 except for the metalization over the visual image producing devices 14 and under the overlying layer of clear protective ink or coating applied thereto by the process step illustrated in FIGS. 10 and 10A. Thereafter, the layer of plastic film 18 is transferred by suitable transfer rollers R in the direction of the arrow 85 into a suitable rinse solution or liquid indicated by general numerical designation 86 and residing in a suitable container 87. The rinse solution or liquid 86 rinses the metalization removal solution or liquid from the outer surface of a layer of plastic film 18 and such rinse solution or liquid may be, for example, water. Thereafter, it will be understood, if desired the layer of plastic film 18 may have its top surface, except for the visual image devices 14, printed or overprinted with background ink 27 as illustrated diagrammatically in FIG. 3 and described hereinabove or, if desired, the layer of plastic film may be transferred by suitable transfer rollers R, as illustrated diagrammatically in FIG. 12, in the direction of the arrow 91 between suitable opposed print rollers 36 and 38. The outer surface of the top print roller 36 is provided with outwardly extended bosses (not shown) shaped to print indicia, e.g. indicia 15 of FIG. A, over the top surface 22 of the layer of plastic film 18 at second predetermined locations. Printing ink is applied to the outer surface of the top roller 36 by suitable ink transfer roller 39 to which suitable print ink is applied from a container thereof 41.

Figure 13:
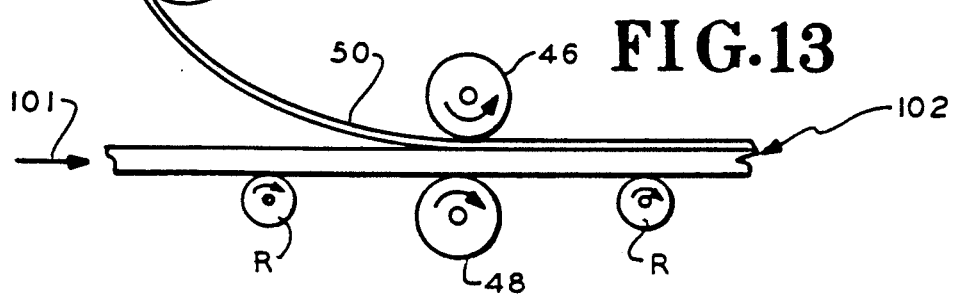

As illustrated diagrammatically in FIG. 13, the layer of plastic film 18 is thereafter transferred by suitable transfer rollers R in the direction of the arrow 101 between suitable laminating rollers 46 and 48 which apply heat and pressure to a laminated layer of suitable clear plastic film 50 from a supply thereof 51 to the top surface of the layer of plastic film 18 and over the visual image producing devices 14 and the printed indicia, e.g. indicia 15 of FIG. A, printed on the top surface 22 of the layer of plastic film 18. As taught hereinabove with regard to FIG. 5, the heat applied by the laminating rollers will be less than the heat distortion temperature of the layer of plastic film 18 to prevent distortion of the visual image producing devices 14 embossed therein.

It will be understood that the manufacturing process steps illustrated diagrammatically in FIGS. 8-13 produce a laminate indicated by general numerical designation S3 which includes the layer of clear plastic film 50, the clear protective ink or coating overlying the metalized visual image producing devices 14, the visual image producing devices 14, the indicia, e.g. indicia 15 of FIG A, printed alternatively on the top surface 22 of the layer of plastic film 18 or on background ink 27 applied to the top surface 18, and the layer of plastic film 18.

Figure 14:
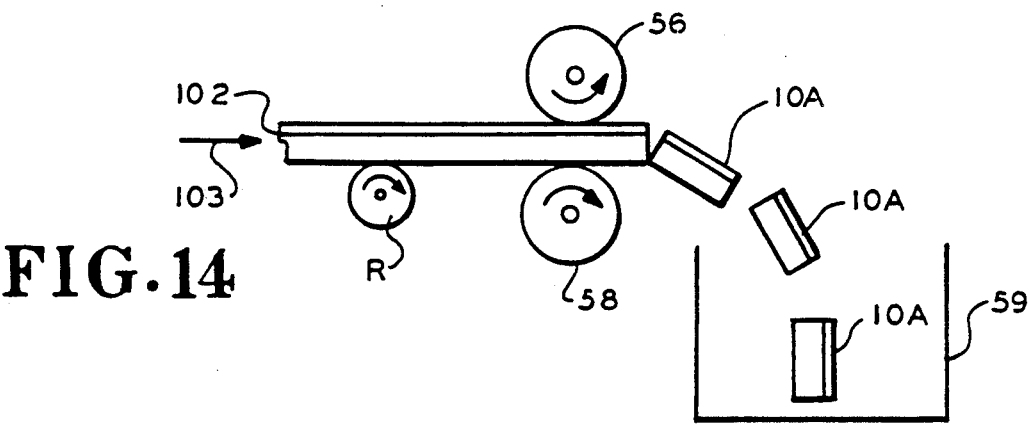

The laminate S3, as illustrated diagrammatically in FIG. 14, is thereafter advanced by suitable transfer rollers R in the direction of the arrow 103 between suitable cutting rollers 56 and 58 with the surface of the upper cutting roller 56 being provided with outwardly extending cutting edges (not shown) placed in registration with the dashed lines indicating the plurality of security cards 10A, as shown in FIGS. 8-10 and 12, to cut along the dashed outlines and produce a plurality of individual security cards 10A as indicated diagrammatically in FIG. 14 and shown falling into a suitable container or bin 59; alternatively, as taught above, cutting along the dashed lines may be by suitable steel rule dies.

Subsequently, as illustrated diagrammatically in FIG. 15, each individual security card 10A is suitably advanced in the direction of the arrow 105 between a pair of suitable opposed embossing rollers 64 and 66 for embossing indicia, e.g. indicia indicated by general numerical designation 16 in FIG. A, into the security card 10A at a third predetermined location and preferably at least partially into the visual image producing device 14 as illustrated in FIG. A and for the security purposes described above.

Figure 15:
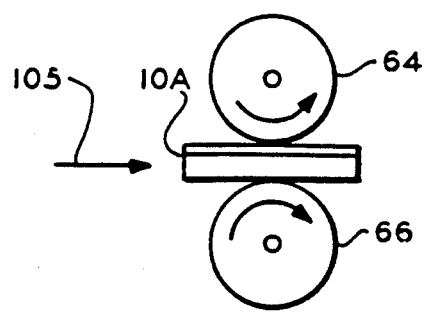

Accordingly, it will be understood that the security card 10A upon exiting between the embossing rollers 64 and 66 shown in FIG. 15 is a security card embodying the present invention and being a manufacture or article of manufacture produced by the above-described alternate process of the present invention for mass producing a plurality of such security cards as illustrated diagrammatically in FIGS. 8–15.

Referring again to FIGS. 8–11 and the above description of the manufacturing process steps illustrated diagrammatically therein, it will be understood that in accordance with the further teachings of the present invention upon the manufacturing process steps illustrated diagrammatically in FIGS. 8–11 being completed there is produced by the present invention a substrate indicated in FIG. 11 (rightward portion) by general numerical designation S3 which is a new and useful manufacture or article of manufacture as provided for by 35 U.S.C. 101. Substrate S3 is a security card substrate from which a plurality of security cards 10A may be further manufactured by different third parties utilizing the manufacturing process steps illustrated diagrammatically in FIGS. 8–11 and described above to further complete the manufacture of the security cards 10A. As taught hereinabove with regard to substrates S1 and S2, substrate S3 has the flexibility of being able to be used by different third parties to further manufacture completed security cards 10A as taught herein wherein each security card will bear the particular logo and other printed information particular to each individual or different credit card company. Thus, it will be understood further that substrate S3, as with regard to substrates S1 and S2, is saleable as such, has independent commercial life, and is thus both "new" and "useful" as provided for under 35 U.S.C. 101.

Referring again generally to the manufacturing apparatus and process steps illustrated diagrammatically in FIGS. 1–15, it will be understood that the plastic film 18 and the various rollers may be provided with suitable registration marks or indications, indicated diagrammatically by numerical designations 110 and 112 in FIG. 10, for maintaining the various rollers and the layer of plastic film, particularly the image producing devices, and the areas of the top surface on which the above-noted indicia are provided, in registration at all times. This may be done by any one of several such registration techniques and apparatus known to the film processing art.

Lastly, it will be understood that many variations and modifications may be made in the present invention without departing from the spirit and the scope thereof.

What is claimed is:

1. Process of mass manufacturing a plurality of security cards, comprising the steps of:
    (a) embossing a surface of a layer of plastic film at predetermined locations with visual image producing devices;
    (b) metalizing said surface including said visual image producing devices;
    (c) applying a layer of background ink over said metallized surface of step (b) except where said visual image producing devices are located;
    (d) printing indicia on said background ink at second predetermined locations;
    (e) laminating a layer of clear plastic film over said surface to form a laminate;
    (f) cutting individual security cards out of said laminate; and
    (g) embossing indicia into said individual security cards at third predetermined locations.

2. Process according to claim 1 wherein step (g) is the step of embossing indicia into said individual security cards at third predetermined locations including at least partially into said metalized visual image producing devices.

3. Process of manufacturing a security card substrate from which a plurality of security cards may be further manufactured, comprising the steps of:
    (a) embossing a surface of a layer of plastic film at predetermined locations with visual image producing devices; and
    (b) metalizing said surface including said visual image producing devices.

4. Process according to claim 3 wherein said process comprises the further step of:
    (c) applying a layer of background ink over said metallized surface of step (b) except where said visual image producing devices are located.

5. Process according to any one of claim 14 wherein step (a) is the step of embossing a surface of a layer of plastic film at predetermined locations with holograms.

6. Process according to any one of claims 1–4 wherein step (a) is the step of embossing a surface of a layer of plastic film at predetermined locations with diffraction gratings.

7. Process according to claim 1 wherein said laminating step (e) is the step of laminating a layer of clear plastic film over said surface to form a laminate wherein said layer of clear plastic film is laminated with the application of predetermined pressure and temperature and wherein said predetermined temperature is below the heat distortion temperature of said layer of plastic film to prevent distortion of said embossed visual image producing devices.

* * * * *